US012698431B2

(12) United States Patent
Suresh et al.

(10) Patent No.: US 12,698,431 B2
(45) Date of Patent: Aug. 4, 2026

(54) SET ON DEMAND CEMENT

(71) Applicant: Baker Hughes Oilfield Operations LLC, Houston, TX (US)

(72) Inventors: Radhika Suresh, Sugar Land, TX (US); Angela Doan, Spring, TX (US); Rostyslav Dolog, Houston, TX (US); Oleg Mazyar, Katy, TX (US)

( * ) Notice: Subject to any disclaimer, the term of this patent is extended or adjusted under 35 U.S.C. 154(b) by 0 days.

(21) Appl. No.: 18/449,361

(22) Filed: Aug. 14, 2023

(65) Prior Publication Data

US 2025/0059428 A1 Feb. 20, 2025

(51) Int. Cl.
| | |
|---|---|
| *C09K 8/467* | (2006.01) |
| *C04B 14/04* | (2006.01) |
| *C04B 22/12* | (2006.01) |
| *C04B 28/02* | (2006.01) |
| *C04B 40/06* | (2006.01) |
| *C04B 103/10* | (2006.01) |
| *E21B 33/13* | (2006.01) |

(52) U.S. Cl.
CPC ............ *C09K 8/467* (2013.01); *C04B 14/045* (2013.01); *C04B 22/124* (2013.01); *C04B 28/02* (2013.01); *C04B 40/0641* (2013.01); *E21B 33/13* (2013.01); *C04B 2103/10* (2013.01)

(58) Field of Classification Search
CPC ..... C09K 8/467; C04B 14/045; C04B 22/124; C04B 28/02; C04B 40/0641; C04B 2103/10; E21B 33/13
See application file for complete search history.

(56) References Cited

U.S. PATENT DOCUMENTS

| | | | |
|---|---|---|---|
| 4,036,301 | A | 7/1977 | Powers et al. |
| 4,269,279 | A | 5/1981 | House |
| 4,391,925 | A | 7/1983 | Mintz et al. |
| 4,614,599 | A | 9/1986 | Walker |
| 4,664,816 | A | 5/1987 | Walker |
| 5,102,559 | A | 4/1992 | McDougall et al. |
| 6,528,157 | B1 | 3/2003 | Hussain et al. |
| 6,581,701 | B2 | 6/2003 | Heying |
| 7,036,856 | B2 | 5/2006 | Fishencord |
| 7,343,985 | B1 | 3/2008 | Gregg |

(Continued)

FOREIGN PATENT DOCUMENTS

| | | |
|---|---|---|
| CN | 109517588 A | 3/2019 |
| CN | 110591676 A | 12/2019 |

(Continued)

OTHER PUBLICATIONS

Magzoub, M. et al. "Loss Circulation Prevention in Geothermal Drilling by Shape Memory Polymer" Elsevier, Geothermics, vol. 89, Jan. 2021, 101943, 7 pages.

(Continued)

*Primary Examiner* — Crystal J Lee

(74) *Attorney, Agent, or Firm* — Baker Hughes Company

(57) ABSTRACT

A method of cementing a wellbore includes injecting into the wellbore a cement slurry containing: an accelerator composite having a shell encapsulating a core including an accelerator and a disintegrating agent, the disintegrating agent including at least one of a phase change material or a gas-producing material; a cementitious material; and an aqueous carrier; and releasing the accelerator from the accelerator composite.

15 Claims, 3 Drawing Sheets

(56) References Cited

U.S. PATENT DOCUMENTS

| | | | |
|---|---|---|---|
| 7,559,369 B2 | 7/2009 | Roddy et al. | |
| 7,629,297 B2 | 12/2009 | Shaarpour | |
| 7,703,521 B2 | 4/2010 | Sullivan et al. | |
| 7,784,542 B2 | 8/2010 | Roddy et al. | |
| 7,784,566 B2 | 8/2010 | Gregg | |
| 7,806,183 B2 | 10/2010 | Roddy et al. | |
| 7,892,352 B2 | 2/2011 | Roddy et al. | |
| 8,574,667 B2 | 11/2013 | John et al. | |
| 8,586,512 B2 | 11/2013 | Roddy et al. | |
| 8,592,353 B2 | 11/2013 | Dalrymple et al. | |
| 8,598,093 B2 | 12/2013 | Roddy et al. | |
| 8,603,952 B2 | 12/2013 | Roddy et al. | |
| 8,689,869 B2 | 4/2014 | Shindgikar et al. | |
| 8,815,135 B2 | 8/2014 | Beecher et al. | |
| 9,090,812 B2 | 7/2015 | Gerrard et al. | |
| 9,206,344 B2 | 12/2015 | Roddy et al. | |
| 9,238,771 B1 | 1/2016 | Mahmoud | |
| 9,321,956 B2 | 4/2016 | Nguyen et al. | |
| 9,416,050 B2* | 8/2016 | Seidl | C04B 28/02 |
| 9,546,315 B2 | 1/2017 | Pollard et al. | |
| 9,587,163 B2 | 3/2017 | Gaudette et al. | |
| 9,702,217 B2 | 7/2017 | Dolog et al. | |
| 9,765,252 B2 | 9/2017 | Roddy et al. | |
| 10,060,205 B2 | 8/2018 | De Stefano et al. | |
| 10,081,756 B1 | 9/2018 | Reddy et al. | |
| 10,160,896 B2 | 12/2018 | Weaver et al. | |
| 10,385,647 B2 | 8/2019 | Gozalo et al. | |
| 10,590,338 B2 | 3/2020 | Hall et al. | |
| 10,718,883 B2 | 7/2020 | Galliano et al. | |
| 11,008,839 B2 | 5/2021 | Collier et al. | |
| 2007/0032386 A1 | 2/2007 | Abad et al. | |
| 2008/0087431 A1 | 4/2008 | Willauer et al. | |
| 2009/0084539 A1 | 4/2009 | Duan et al. | |
| 2009/0205833 A1 | 8/2009 | Bunnell et al. | |
| 2010/0160189 A1 | 6/2010 | Fuller et al. | |
| 2011/0042075 A1 | 2/2011 | Pearson et al. | |
| 2011/0067872 A1 | 3/2011 | Agrawal | |
| 2011/0088901 A1 | 4/2011 | Watters et al. | |
| 2011/0252781 A1 | 10/2011 | Johnson et al. | |
| 2012/0175118 A1 | 7/2012 | Khatri et al. | |
| 2012/0190593 A1 | 7/2012 | Soane et al. | |
| 2012/0208726 A1 | 8/2012 | Smith et al. | |
| 2013/0126164 A1 | 5/2013 | Sweatman et al. | |
| 2013/0146312 A1 | 6/2013 | Gerrard et al. | |
| 2014/0262529 A1 | 9/2014 | Quintero et al. | |
| 2014/0345878 A1* | 11/2014 | Murphree | E21B 34/142 |
| | | | 166/377 |
| 2015/0047841 A1 | 2/2015 | Mazyar et al. | |
| 2015/0060072 A1 | 3/2015 | Busby et al. | |
| 2015/0159079 A1 | 6/2015 | Huh et al. | |
| 2015/0240609 A1 | 8/2015 | Lucas et al. | |
| 2016/0186044 A1 | 6/2016 | Rothrock et al. | |
| 2016/0312098 A1 | 10/2016 | Savari et al. | |
| 2016/0326829 A1 | 11/2016 | Dolog et al. | |
| 2017/0002257 A1* | 1/2017 | Pisklak | C04B 28/34 |
| 2017/0015824 A1 | 1/2017 | Gozalo et al. | |
| 2017/0240804 A1 | 8/2017 | Tellez et al. | |
| 2017/0356269 A1 | 12/2017 | Denton | |
| 2018/0037803 A1 | 2/2018 | Dahi Taleghani et al. | |
| 2018/0149008 A1 | 5/2018 | Nguyen et al. | |
| 2018/0223180 A1 | 8/2018 | Hall et al. | |
| 2018/0237680 A1 | 8/2018 | Hall et al. | |
| 2018/0258340 A1* | 9/2018 | Rothrock | C09K 8/58 |
| 2019/0031951 A1 | 1/2019 | Johnson et al. | |
| 2019/0375978 A1 | 12/2019 | Shojaei et al. | |
| 2020/0181475 A1* | 6/2020 | Dighe | C04B 40/0641 |
| 2020/0299202 A1 | 9/2020 | Choi et al. | |
| 2020/0354622 A1 | 11/2020 | Sherman et al. | |
| 2020/0362220 A1 | 11/2020 | Musso et al. | |
| 2021/0172303 A1 | 6/2021 | Musso et al. | |
| 2023/0167721 A1 | 6/2023 | Palisch et al. | |
| 2023/0340854 A1 | 10/2023 | Fripp et al. | |
| 2025/0059429 A1 | 2/2025 | Suresh et al. | |
| 2025/0059436 A1 | 2/2025 | Mazyar et al. | |
| 2025/0059837 A1 | 2/2025 | Dolog et al. | |
| 2025/0059838 A1 | 2/2025 | Dolog et al. | |
| 2025/0059854 A1 | 2/2025 | Shepherd et al. | |

FOREIGN PATENT DOCUMENTS

| | | | |
|---|---|---|---|
| CN | 111303847 A | 6/2020 | |
| KR | 20190036399 A | 4/2019 | |
| WO | 03044317 A1 | 5/2003 | |
| WO | 2009106796 A1 | 9/2009 | |
| WO | 2014092888 A1 | 6/2014 | |

OTHER PUBLICATIONS

Cabeza et al., "Evaluation of volume change in phase change materials during their phase transition"; Journal of Energy Storage 28 (2020); Jan. 14, 2020; 4 pages.

Da Cunha et al., "Thermal energy storage for low and medium temperature applications using phase change materials—A review"; Applied Energy 177 (2016); May 24, 2016; 12 pages.

Farley et al., "Field Test of a Self-Conforming Oil Recovery Fluid"; Journal of Petroleum Technology; Nov. 1, 1976; 7 pages.

Frampton, et al., "Development Of A Novel Waterflood Conformance Control System"; SPE/DOE Symposium, Tulsa OK, Apr. 2004; Paper No. SPE-89391-MS; 7 pages.

Garmeh et al., "Thermally Active Polymer To Improve Sweep Efficiency of Waterfloods: Simulation and Pilot Design Approaches"; SPE Paper No. 144234; Jul. 19, 2011; 13 pages.

Himes, et al., Reversible, Crosslinkable Polymer for Fluid-Loss Control'; Society of Petroleum Engineers, SPE Paper No. 27373; Feb. 7, 1994; 2 pages.

Jankowski et al., "A review of phase change materials for vehicle component thermal buffering"; Applied Energy 113 (2014); Oct. 4, 2013; 37 pages.

Kahar et al., "The Versatility of Polymeric Materials as Self-Healing Agents for Various Types of Applications: A Review"; Polymers 2021, 13, 1194; 34 pages.

Kenisarin, "High-temperature phase change materials for thermal energy storage"; Renewable and Sustainable Energy Reviews 14 (2010); Oct. 28, 2009; 16 pages.

Korojy, "Volume Change Effects during Solidification of Alloys"; Royal Institute of Technology; Doctoral Thesis; Jun. 2009; 58 pages.

Li, et al., "Study of solid-solid phase change . . . "; Thermochimica Acta 326 (1999); 4 pages.

Maffeis et al., Application of Thermally Activated Polymers in a Mature Oil Field: Candidates Selection, Field Implementation and Preliminary Results': Offshore Mediterranean Conference; Mar. 2017; 6 pages.

Mansour, Ahmed et al., "Smart Expandable LCMs—A Theoretical and Experimental Study;" American Association of Drilling Engineers; Apr. 11, 2017; 7 pages.

Mansour, Ahmed et al., "Smart lost circulation materials for productive zones;" Journal of Petroleum Exploration and Production Technology; May 2, 2018; 16 pages.

Peng, et al.; "Phase Change Material (PCM) Microcapsules for Thermal Energy Storage"; Advances in Polymer Technology; vol. 2020, Article ID 9490873; 20 pages; Jan. 12, 2020.

Pereira et al., "Polymers as Encapsulating Agents and Delivery Vehicles of Enzymes"; Polymers 2021, 13, 4061; Nov. 21, 2021; 28 pages.

Rogers et al., "New Equipment Designs Enable Swellable Technology in Cementless Completions"; IADC/SPE Drilling Conference; Mar. 4, 2008.

Savari et al., "Lost Circulation Management in Naturally Fractured Formations: Efficient Operational Strategies and Novel Solutions": IADC/SPE Drilling Conference and Exhibition; Mar. 1, 2016.

Savari et al., "Lost Circulation Management in Naturally Fractured Reservoirs"; SPE/IADC Middle East; Jan. 2016; 6 pages.

Zhong et al., "Mitigation of Lost Circulation in Oil-Based Drilling Fluids Using Oil Absorbent Polymers;" Materials; Oct. 18, 2019; 20 pages.

(56)     References Cited

OTHER PUBLICATIONS

Notification of Transmittal of the International Search Report and the Written Opinion of the International Searching Authority, or the Declaration; PCT/US2024/041898; Mail date Nov. 19, 2024; 10 pages.
International Search Report and Written Opinion for International Application No. PCT/US2024/041891, International Filing Date Aug. 12, 2024, Date of Mailing Nov. 27, 2024, 10 pages.
International Search Report and Written Opinion for International Application No. PCT/US2024/041892, International Filing Date Aug. 12, 2024, Date of Mailing Nov. 22, 2024, 9 pages.
International Search Report and Written Opinion for International Application No. PCT/US2024/041894, International Filing Date Aug. 12, 2024, Date of Mailing Nov. 26, 2024, 12 pages.

* cited by examiner

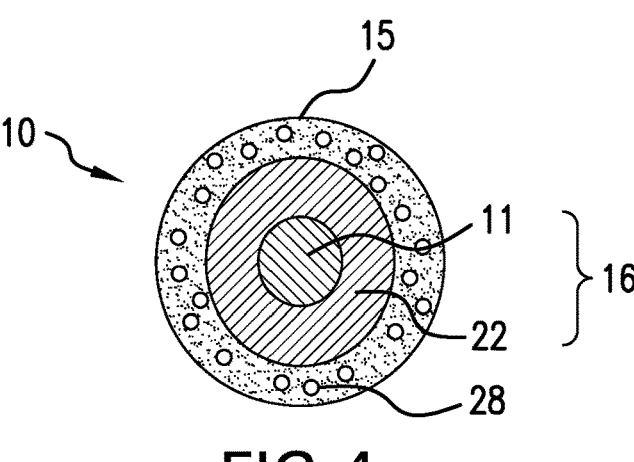
FIG.4
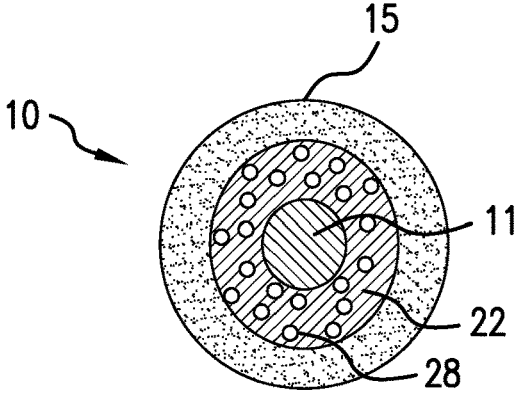
FIG.5
FIG.6

SET ON DEMAND CEMENT

BACKGROUND

In the oil and gas industry, cementing is a technique employed during many phases of borehole operations. For example, cement may be employed to secure various casing strings and/or liners in a well. In other cases, cement may be used in remedial operations to repair casing and/or to achieve formation isolation. In still other cases, cement may be employed to isolate selected zones in the borehole and to temporarily or permanently abandon a borehole.

A cement slurry can be formed by mixing dry cement components with water using hydraulic jet mixers, re-circulating mixers, or batch mixers. Since the cement slurry has to remain pumpable before it reaches the desired location downhole, normally a cement slurry is used right after it is formed. In addition, once a cement slurry is injected into a wellbore, the set time can be affected by the temperature of the wellbore. As such, the set time is not controllable as it is desired by the users but rather ruled by the well conditions and the time when a cement slurry is formed. Accordingly, there is a need for methods that are effective to control the set time of the cement based on the user's demand.

BRIEF DESCRIPTION

A method of cementing a wellbore includes injecting into the wellbore a cement slurry containing: an accelerator composite having a shell encapsulating a core including an accelerator and a disintegrating agent, the disintegrating agent including at least one of a phase change material or a gas-producing material; a cementitious material; and an aqueous carrier; and releasing the accelerator from the accelerator composite.

A cement slurry includes: an accelerator composite having a shell encapsulating a core comprising an accelerator and a disintegrating agent, the disintegrating agent including at least one of a phase change material or a gas-producing material; a cementitious material; and an aqueous carrier; wherein the accelerator includes at least one of an alkali metal salt, or an alkali earth metal salt.

BRIEF DESCRIPTION OF THE DRAWINGS

The following descriptions should not be considered limiting in any way. With reference to the accompanying drawings, like elements are numbered alike:

FIG. 4 illustrates an accelerator composite comprising a magnetic material disposed in a shell of the accelerator composite;

FIG. 5 illustrates an accelerator composite comprising a magnetic material disposed in an outer core of a disintegrating agent:

FIG. 6 illustrates an accelerator composite having a shell, an inner core of an accelerator, and a disintegrating agent and a magnetic material disposed in a matrix between the inner core and the shell.

DETAILED DESCRIPTION

Figure 1:
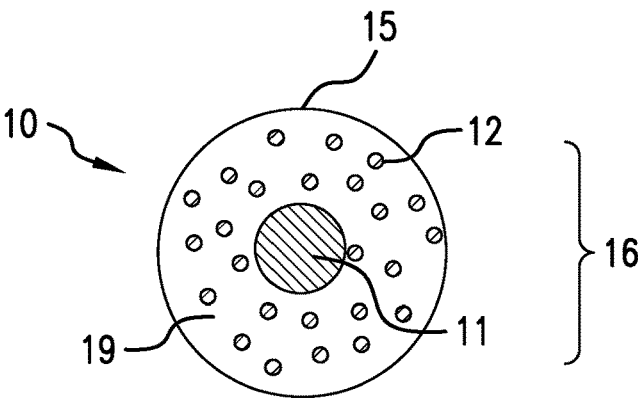
FIG. 1 illustrates an accelerator composite having a shell, an inner core of an accelerator, and a disintegrating agent disposed in a matrix between the inner core and the shell.

Methods are provided that are effective to decouple a cement slurry's set time from wellbore temperatures and the time when a cement slurry is formed. The methods include a mechanism which can controllably activate the cement slurry. Once activated, the cement slurry can quickly set. The methods allow for reduced set times as well as reduced critical hydration periods. Set on demand methods also allow for safer placement of a cement slurry within a flexible time frame after the slurry is formed.

The cement slurry contains a composite having a shell protecting an accelerator core. The core-shell composite also contains a disintegrating agent capable of exerting pressure on the shell from within the composite when triggered thereby breaking the shell and releasing the accelerator. The released accelerator can then accelerate the setting of the cement slurry.

By using a protective shell, the activity of the accelerator is preserved for the intended application. In addition, loss due to adsorption is prevented. Moreover, the accelerator can be released when needed since the disintegration of the shell can be triggered on demand.

The accelerator can include alkali metal salts such as potassium chloride, sodium chloride, sodium meta silicate, alkaline earth metal salts such as calcium chloride, calcium sulfate hemihydrate, a mixture of calcium sulfate hemihydrate and Portland cement, or a combination comprising at least one of the foregoing.

In the composite, the accelerator is encapsulated in a shell to delay its release or contact with other components of the cement slurry. The shell of the composite can include natural polymers such as alginate, cellulose, starch, chitosan, dextran sulfate, pectin, or xanthan gum; or synthetic polymers such as polymethacrylate, polydimethylsiloxane, polystyrene, polyvinyl acetate, or polyvinylpyrrolidone. The shell can also include inorganic materials such as silica, alumina, titania, sodium silicate, or calcium carbonate; metallic materials such as nickel, nickel phosphorus, or nickel alloys; iron oxides such as magnetite, maghemite, and haematite; oxy-hydroxides such as goethite, ferrihydrite, and lepidocrocite; iron salts such as iron carbonates, iron sulfides, and iron carbides; or a combination thereof.

The thickness of the shell can be about 5 μm to about 5000 μm or about 200 μm to about 1000 μm.

The accelerator composite includes a disintegrating agent, which comprises at least one of a phase change material (PCM) or a gas-producing material. As used herein, a PCM is a substance that can have a volumetric expansion at phase transition. Preferably, the PCM used in the composite of the disclosure can have a volumetric expansion of at least 3 vol %, at least 5 vol %, or at least 10 vol % during phase transition, each based on the initial volume of the PCM before expansion or before phase transition. The phase transition temperature of the PCM can be between about 125° F. (52° C.) and about 1000° F. (538° C.), more specifically between about 125° F. (52° C.) and about 700° F. (371° C.). PCMs with transition temperatures between about 500° F. (260° C.) and about 1000° F. (538° C.) can be activated by applying short term localized magnetic heating that would not negatively affect core matrix material if present and/or encapsulated accelerator. Furthermore, a magnetic material that provides heating electromagnetic energy can be coated on a PCM to further localize heat inside a composite to regions with PCM.

The PCM can be a variety of different materials classes, including inorganic materials such as salts, salt hydrates, metal hydroxides, hydrates of metal hydroxides, metallic compounds, or metal alloys; organic materials such as paraffins, fatty acids, esters, or alcohols; or eutectic materials such as inorganic-inorganic eutectic materials, inorganic-organic eutectic materials, or organic-organic eutectic materials.

Inorganic salts, and their eutectic mixtures and metal hydroxides can be salts of I, II, III, IV groups that are halides, nitrates, carbonates, nitrites, sulfates, sulfites, metal hydroxides, or eutectic mixtures of thereof. Preferably, the PCM is a nitrite, halide, or hydroxide of metals of groups I and II, or eutectic mixtures of thereof. Some of the inorganic salts can also make eutectic mixtures with organic materials.

Specific examples of the inorganic salts, and their eutectic mixtures and metal hydroxides include $KNO_3$, $KNO_3$—$NaNO_3$, $Li_2CO_3$—$K_2CO_3$, LiF—NaF—KF—$MgF_2$, LiF—NaF—KF, LiF—KF, $LiKCO_3$, $LiNO_3$, $LiNO_3$—$NaNO_3$, $NaNO_2$, or $NaNO_3$.

Examples of an organic PCM include paraffines such as RT-58, high density polyethylene (HDPE), d-mannitol, hydroquinone, adipic acid, urea, acetamide, erythritol, phthalic anhydride, maleic acid, 2-chlorobenzoic acid, sugars, sugar alcohols, or fatty acids or their derivatives.

Paraffins with chain length of greater than 25 ($C_nH_{2n+2}$, with n>25) have melting points over 125° F. and typically exhibit volumetric expansion of >10%, usually ~15% or even more and can be a preferred PCM for the disclosed composite. Paraffin with n=100 (Hectane) for example has a melting temperature of 115° C. or 239° F. Accordingly, depending on the specific application and the desired phase transition temperature, a paraffin with a corresponding chain length can be selected.

A PCM with 10-15% volumetric change can include sugars or sugar alcohols. Examples of a sugar or sugar alcohol PCM include glycerol, xylitol, sorbitol, erythritol, glucose, fructose, isomalt, maltitol, lactitol, xylose-D, xylose-L, d-mannitol, or galactitol.

A PCM can also include hydrates of inorganic salts. These materials can break the shell by exerting pressure on the shell in two unique ways. Like other PCMs, hydrates of inorganic salts can expand in volume during PCM phase transition. Unlike other PCMs, hydrates of inorganic salts can also release water, which can generate additional pressure on the shell when water transitions to vapor if heated above its boiling point. Examples of the hydrate of inorganic salts PCM include barium hydroxide octahydrate, magnesium nitrate hexahydrate, or magnesium chloride hexahydrate. Other examples may include hydrates of salts of I, II, III, IV groups that are halides, nitrates, carbonates, nitrites, sulfates, sulfites, or eutectic mixtures of thereof.

The disintegrating agent can also include compounds that do not expand during phase transition but can undergo thermal decomposition and produce gas molecules leading to a volume expansion. The gas-producing compound can include at least one of an azo compound, an azide compound, or a metal carbonyl. Azo compounds can release nitrogen upon heating, and can be used as a disintegrating agent in the disclosed composite. Examples of azo compounds include azobisisobutyronitrile (AIBN). Organic azide is an organic compound that contains an azide ($—N_3$) functional group. Sodium azide is the inorganic compound with the formula $NaN_3$.

Metal carbonyls which are volatile and low-melting compounds of the $M_x(CO)_y$ type that decompose on heating into carbon monoxide and metal. Examples of metal carbonyls include $V(CO)_6$, $Cr(CO)_3$, $Mo(CO)_6$, $W(CO)_6$, $Mn_2(CO)_{10}$, $Tc_2(CO)_{10}$, $Fe(CO)_6$, $Os(CO)_5$, $Os_3(CO)_{12}$, $Rh_2(CO)_8$, [Rh $(CO)_3]_x$, $Rh_6(CO)_{15}$, $Ir_2(CO)_8$, $Ni(CO)_4$, or [$Pt(CO)_2$].

The accelerator composite can comprise about 1 to about 50 wt % or about 5 to about 25 wt % of the accelerator, and about 0 to about 25 wt %, about 1 to about 25 wt % or about 5 to about 15 wt % of the disintegrating agent, each based on a total weight of the accelerator composite.

The accelerator can be combined with the disintegrating agent and encapsulated within a solid shell. The geometric arrangements of the accelerator and the disintegrating agent are not particularly limited. The accelerator can form an inner core while the disintegrating agent can form an outer core disposed between the inner core and the shell. Alternatively, the disintegrating agent can form an inner core, and the accelerator can form an outer core disposed between the inner core and the shell. In another aspect, the accelerator and the disintegrating agent can be randomly distributed in a core encapsulated by a shell.

Figure 2:
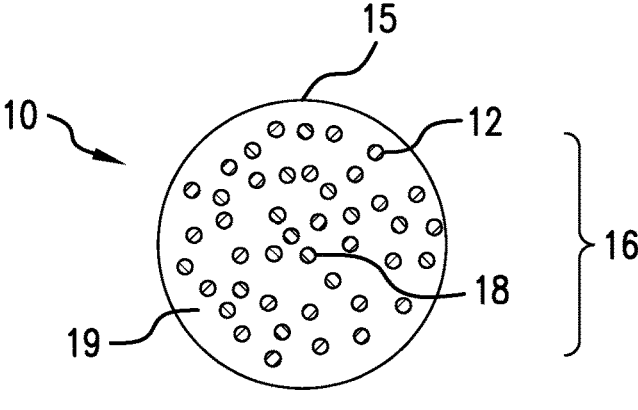
FIG. 2 illustrates an accelerator composite having a shell encapsulating an accelerator and a disintegrating agent disposed in a matrix.
Figure 3:
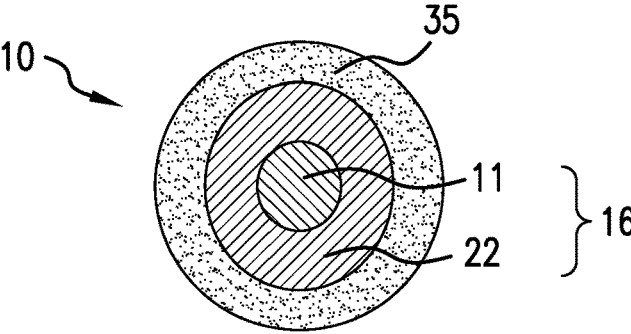
FIG. 3 illustrates an accelerator composite having a shell encapsulating a core, where the core has an inner core of an accelerator, and an outer core of a disintegrating agent disposed between the inner core and the shell.

FIG. 1 illustrates an accelerator composite (10) where the disintegrating agent (12) can be disposed in a matrix (19) between an inner core (11) of an accelerator and the shell (15), which encapsulating the core (16). FIG. 2 illustrates an accelerator composite (10) where the core (16) includes an accelerator (18) and a disintegrating agent (12) disposed in a matrix (19) encapsulated in the shell (15). FIG. 3 illustrates an accelerator composite (10) where the core (16) has an inner core (11) of an accelerator, and an outer core (22) of a disintegrating agent disposed between the inner core (11) and the shell (15).

As used herein, the matrix is incompressible so that the matrix does not absorb the pressure or force generated by the disintegrating agent upon activation. The matrix can include a matrix material such as organic solvents, water, ionic liquids, crude oils, or mineral oils. A matrix can include more than one matrix material.

The composite can further comprise a magnetic material. Suitable magnetic materials can include a paramagnetic material, a superparamagnetic material, or a ferromagnetic material. The magnetic material can be part of the core containing the accelerator and the optional disintegrating agent. The magnetic material can also be included in the shell of the composite. Illustratively the magnetic material includes but is not limited to iron; nickel; cobalt; ferrite; iron oxides such as magnetite, maghemite, and haematite; oxyhydroxides such as goethite, ferrihydrite, and lepidocrocite; and sulphides such as greigite and pyrrhotite; other iron salts such as iron carbonates, iron sulfides, and iron carbides; or a combination thereof. If present, the accelerator composite can comprise about 0.01 to about 5 wt %, about 0.05 to about 0.5 wt %, or about 0.1 to about 0.2 wt % of a magnetic material, each based on a total weight of the accelerator composite.

FIG. 4 illustrates an accelerator composite (10) comprising a magnetic material (28) included in a shell (15) of the composite. The composite comprises a core (16), which includes an inner core (11) of an accelerator, and an outer core (22) of a disintegrating agent disposed between the inner core (11) and the shell (15).

FIG. 5 illustrates an accelerator composite (10) comprising a magnetic material (28) disposed in an outer core (22) of a disintegrating agent between an inner core (11) of an accelerator and a shell (15).

FIG. 6 illustrates an accelerator composite (10) comprising a magnetic material (28) and a disintegrating agent (12) disposed in a matrix (19) between an inner core (11) of an accelerator and a shell (15), which encapsulates the core (16).

Figure 7:
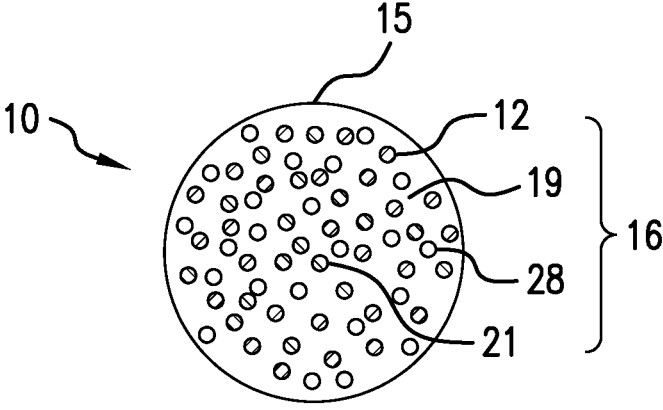
FIG. 7 illustrates an accelerator composite having a shell encapsulating an accelerator, a disintegrating agent, and a magnetic material disposed in a matrix encapsulated by a shell.

FIG. 7 illustrates an accelerator composite (10) comprising a shell (15) encapsulating a core (16) comprising an accelerator (21), a disintegrating agent (12), and a magnetic material (28) disposed in a matrix (19).

The amount of the accelerator composite is not particularly limited and is generally in an amount sufficient to accelerate the setting of the cement slurry once the accelerator is released. The accelerator composite can be present in the cement slurries in an amount of about 0.1 to about 10 wt %, based on the weight of the cementitious material, preferably about 0.5 to about 5 wt %, based on the weight of the cementitious material.

The accelerator composite as described herein can be manufactured via methods such as physical methods, chemical methods, or physical-chemical methods, for example, those methods as described in Advances in Polymer Technology Volume 2020, Article ID 9490873.

In physical methods, the formation of the shell only involves physical processes such as drying, dehydration, and adhesion. Examples of physical methods for encapsulating the accelerator and the disintegrating agent include spray-drying and solvent evaporation. In a spray-drying method, an oil-water emulsion containing the accelerator, the disintegration agent, the optional magnetic material, the optional matrix material, and the shell material can be sprayed in a drying chamber by using an atomizer, drying the sprayed droplets through drying gas stream, and separating the solid particles by cyclone and filter. In a solvent evaporation method, the accelerator, the disintegrating agent, the optional magnetic material, and the optional matrix material can be added to a polymer solution containing the shell material dissolved in a volatile solvent to form an emulsion, and the shell can be formed on the droplets by evaporating the solvent. The composite can then be formed through filtration and drying.

Chemical microencapsulation methods utilize polymerization or a condensation process of monomers, oligomers, or prepolymers as raw materials to form shells at an oil-water interface. For example, individual components, e.g., the accelerator, the disintegrating agent, the optional magnetic material, the optional matrix material, and the resin material (e.g., monomers and/or oligomers used to form a shell) can be combined in a vessel or reactor to form a reaction mixture, and then agitated to mix components. The reaction mixture can be heated at a temperature or at a pressure commensurate with forming the shell.

Hydrolysis and subsequent condensation can also be used to form inorganic shells. For example, alkoxysilanes or metal oxides can undergo hydrolysis then condensation to form a shell of silica, alumina or titania.

In addition to the accelerator composite, the cement slurry further comprises a cementitious material. The cementitious material can be any material that sets and hardens by reaction with water, and is suitable for forming a set cement downhole, including mortars and concretes. Suitable cementitious materials, including mortars and concretes, can be those typically employed in a wellbore environment, for example those comprising calcium, magnesium, barium, aluminum, silicon, oxygen, and/or sulfur. Such cementitious materials include, but are not limited to, Portland cements, pozzolan cements, gypsum cements, high alumina content cements, silica cements, and high alkalinity cements, or combinations of these. Portland cements are particularly useful. In some embodiments, the Portland cements that are suited for use are classified as Class A, B, C, G, and H cements according to American Petroleum Institute, API Specification for Materials and Testing for Well Cements, and ASTM Portland cements classified as Type I, II, III, IV, and V.

The cementitious material can be present in the cement slurry in an amount of about 5 to about 60 wt. % based on the total weight of the cement slurry, preferably about 10 to about 45 wt. % of the weight of the cement slurry, more preferably about 15 to about 40 wt. %, based on the total weight of the cement slurry.

The cement slurry can optionally contain aggregate. The term "aggregate" is used broadly to refer to a number of different types of both coarse and fine particulate material, including, but not limited to, sand, gravel, slag, recycled concrete, silica, glass spheres, limestone, feldspar, and crushed stone such as chert, quartzite, and granite. The fine aggregates are materials that almost entirely pass through a Number 4 sieve (ASTM C 125 and ASTM C 33). The coarse aggregate are materials that are predominantly retained on a Number 4 sieve (ASTM C 125 and ASTM C 33). In an embodiment, the aggregate comprises sand such as sand grains. The sand grains can have a size from about 1 μm to about 2000 μm, specifically about 10 μm to about 1000 μm, and more specifically about 10 μm to about 500 μm. As used herein, the size of a sand grain refers the largest dimension of the grain. Aggregate can be present in an amount of about 10 wt % to about wt 95%, about 10 wt % to about 85 wt %, about 10 wt % to about 70 wt %, about 20 wt % to about 80 wt %, about 20 wt % to about 70 wt %, about 20 wt % to about 60 wt %, about 20 wt % to about 40 wt %, about 50 wt % to about 80 wt %, or about 50 wt % to about 70 wt % based on a total weight of the cement slurry.

The cement slurry further comprises an aqueous carrier fluid. The aqueous carrier fluid is present in the cement slurries in an amount of about 0.5 wt % to about 60 wt %, specifically in an amount of about 1 wt % to about 40 wt %, more specifically in an amount of about 1 wt % to about 15 wt % or about 2 wt % to about 15 wt %, based on the total weight of the cement slurry. The aqueous carrier fluid can be fresh water, brine (including seawater), an aqueous base, or a combination comprising at least one of the foregoing. It will be appreciated that other polar liquids such as alcohols and glycols, alone or together with water, can be used in the carrier fluid. In an embodiment, the cement slurry comprises water in an amount of about 0.5 wt % to about 60 wt %, specifically in an amount of about 1 wt % to about 40 wt %, more specifically in an amount of about 1 wt % to about 15 wt % or about 2 wt % to about 15 wt %, based on the total weight of the cement slurry.

The cement slurry can further comprise various additives. Exemplary additives include a retarder, a high range water reducer or a superplasticizer, a reinforcing agent, a self-healing additive, a fluid loss control agent, a weighting agent to increase density, an extender to lower density, a foaming agent to reduce density, a dispersant to reduce viscosity, a thixotropic agent, a bridging agent or lost circulation material, a clay stabilizer, ductility control agents, or a combination comprising at least one of the foregoing. These additives are selected to avoid imparting unfavorable characteristics to the cement slurry, and to avoid damaging the wellbore or subsurface formation. Each additive can be present in amounts known generally to those of skill in the art.

Retarders can retard the set time of the cement slurry until the cement slurry has reached its ultimate location within the subterranean formation. Exemplary retarders include lignosulfonates, organic acids, phosphonic acid derivatives, synthetic polymers (e.g., copolymers of 2-acrylamido-2-methylpropane sulfonic acid ("AMPS") and unsaturated carboxylic acids), inorganic borate salts, and combinations thereof.

High range water reducers or superplasticizers can be grouped under four major types, namely, sulfonated naphthalene formaldehyde condensed, sulfonated melamine formaldehyde condensed, modified lignosulfonates, and other types such as polyacrylates, polystyrene sulfonates.

Reinforcing agents include fibers such as metal fibers and carbon fibers, silica flour, and fumed silica. The reinforcing agents act to strengthen the set material formed from the cement slurries.

Self-healing additives include swellable elastomers, encapsulated cement particles, and a combination comprising at least one of the foregoing. Self-healing additives are known and have been described, for example, in U.S. Pat. Nos. 7,036,586 and 8,592,353.

Fluid loss control agents can be present, for example a latex, latex copolymers, nonionic, water-soluble synthetic polymers and copolymers, such as guar gums and their derivatives, poly(ethyleneimine), cellulose derivatives, and polystyrene sulfonate.

Weighting agents are high-specific gravity and finely divided solid materials used to increase density, for example silica flour, fly ash, calcium carbonate, barite, hematite, ilemite, sideritewollastonite, hydroxyapatite, fluorapatite, chlorapatite and the like. In some embodiments, about 15 wt % to about 55 wt % of wollastonite is used in the cement slurry, based on the total weight of the cement slurries. Hollow nano- and microspheres of ceramic materials such as alumina, zirconia, titanium dioxide, boron nitride, and carbon nitride can also be used as density reducers.

Extenders include low density aggregates as described above, clays such as hydrous aluminum silicates (e.g., bentonite (85% mineral clay smectite), pozzolan (finely ground pumice of fly ash), diatomaceous earth, silica, e.g., a quartz and condensed silica fumed silica, expanded Pearlite, gilsonite, powdered coal, and the like.

The aqueous carrier fluid of the cement slurry can be foamed with a liquid hydrocarbon or a gas or liquefied gas such as nitrogen, or air. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is mainly used in low pressure or water sensitive formations. A mixture of foaming and foam stabilizing dispersants can be used. Generally, the mixture can be included in the cement slurry in an amount of about 1% to about 5% by volume of water in the cement slurry.

Examples of suitable dispersants include but are not limited to naphthalene sulfonate formaldehyde condensates, acetone formaldehyde sulfite condensates, and glucan delta lactone derivatives. Other dispersants can also be used depending on the application of interest.

Clay stabilizers prevent a clay from swelling downhole upon contact with the water or applied fracturing pressure and can be, for example, a quaternary amine, a brine (e.g., KCl brine), choline chloride, tetramethyl ammonium chloride, or the like. Clay stabilizers also include various salts such as NaCl, $CaCl_2$, and KCl.

The pH of the cement slurry can be about 7 to about 13, about 7 to about 10, about 7 to about 9 or about 7 to about 8. A buffering agent can be optionally included in the cement slurries. Exemplary buffering agents include 2-amino-2-hydroxmethyl-propane-1,3-diol (TRIS), phosphate, carbonate, histidine, BIS-TRIS propane, 3-(N-morpholino)propanesulfonic acid (MOPS), (4-(2-hydroxyethyl)-1-piperazineethanesulfonic acid (HEPES), 2-[[1,3-dihydroxy-2-(hydroxymethyl)propan-2-yl]amino]ethanesulfonic acid (TES), 4-(N-Morpholino)butanesulfonic acid (MOBS), 3-(N-morpholino)propanesulfonic acid (MOPS), 3-(N,N-Bis[2-hydroxyethyl]amino)-2-hydroxypropanesulfonic acid (DIPSO), N-Tris(hydroxymethyl)methyl]-3-amino-2-hydroxypropanesulfonic acid (TAPSO), triethanolamine (TEA), pyrophosphate, N-(2-Hydroxyethyl)piperazine-N'-(2-hydroxypropanesulfonic acid) (HEPPSO), piperazine-1,4-bis(2-hydroxypropanesulfonic acid) dehydrate (POPSO), tricine, glyccylglycine, bicine, N-[tris(hydroxymethyl)methyl]-3-aminopropanesulfonic acid (TAPS), taurine, ammonia, ethanolamine, glycineTRIS, piperazine-N,N'-bis (2-ethanesulfonic acid) (PIPES).

The solid content of the cement slurry can be about 30 wt % to about 90 wt %, preferably about 60 wt % to about 90 wt %, more preferably about 65 wt % to about 85 wt %, based on the total weight of the cement slurry.

The density of the cement slurry can vary widely depending on downhole conditions. Such densities can include about 5 to about 17 or about 5 to about 12 pounds per gallon when foamed. When unfoamed the density of a cement slurries can vary with such densities between about 9 up to about 20, about 9 up to about 15 pounds per gallon, or about 10 to about 14 pounds per gallons, or about 11 up to about 13 pounds per gallon. The cement slurries can also be higher density, for example about 15 to about 27 pounds per gallon or about 15 to about 22 pounds per gallon.

The various properties of the cement slurry can be varied and can be adjusted according to well control and compatibility parameters of the particular fluid with which it is associated for example a drilling fluid. The cement slurry can be used to form downhole components, including various casings, seals, plugs, packings, liners, and the like. The cement slurries can be used in vertical, horizontal, or deviated wellbores.

In general, the components of the cement slurry can be premixed or is injected into the wellbore without mixing, e.g., injected "on the fly" where the components are combined as they are being injected downhole. Preferably the cement slurry are formed by blending the accelerator composite, the cementitious material, the aggregate, and the aqueous carrier before the cement slurries are injected into the wellbore.

A pumpable or pourable cement slurry can be formed by any suitable method. In an exemplary embodiment, the components of the cement slurries are combined using conventional cement mixing equipment. The cement slurry can then be injected, e.g., pumped and placed by various conventional cement pumps and tools to any desired location within the wellbore to fill any desired shape form. In an embodiment, injecting the cement slurry comprises pumping the cement slurry via a tubular in the wellbore. For example, the cement slurry can be pumped into an annulus between a tubular and a wall of the wellbore via the tubular. Once the cement slurry has been placed and assumed the shape form of the desired downhole article, the cement slurry is allowed to set and form a permanent shape of an article, for example, a plug.

The method is particularly useful for cementing a wellbore, which includes injecting, generally pumping, into the wellbore the cement slurry at a pressure sufficient to displace a drilling fluid, for example a drilling mud, a cement spacer, or the like, optionally with a "lead cement slurry" or a "tail cement slurry". The cement slurry can be introduced between a penetrable/rupturable bottom plug and a solid top plug.

Once placed, the accelerator composite can be activated or triggered to release the accelerator. Breaking the shell can include raising the temperature of the composite using hot liquid, or steam. The heat source can include the formation itself. For example, the accelerator composite can be activated when it is allowed to stay in the downhole environment (as opposed to just passing by) for an extended period of time. When the composite temperature achieves the phase transition temperature for the PCM, the PCM expands exerting pressure on the shell until it breaks thus releasing the accelerator. In the event that the disintegrating agent comprises a gas-producing material, the temperature increase can cause the gas-producing material to decompose, producing a gas to break the shell.

The integrity of the shell can also be compromised by ultrasound, chemical degradation, or dissolution in combination with the temperature increase. For the composite that contains a magnetic material, the temperature of the composite can be increased by exposing the magnetic material to a thermomagnetic radiation, for example by inducing Eddy current in it, and/or by magnetic induction heating or via a process known as Neel relaxation through the application of the oscillating electromagnetic field on the composites. The heat produced by the magnetic material can cause the PCM to expand and/or to cause the gas-producing material to generate a gas, thus breaking the shell and releasing the accelerator.

The cement slurry is then allowed to harden, and in some embodiments, forms a cement plug in the wellbore annulus, which prevents the flow of reservoir fluids between two or more permeable geologic formations that exist with unequal reservoir pressures.

Set forth are various embodiments of the disclosure.

Aspect 1. A method of cementing a wellbore, the method comprising: injecting into the wellbore a cement slurry comprising: an accelerator composite having a shell encapsulating a core comprising an accelerator and a disintegrating agent, the disintegrating agent comprising at least one of a phase change material or a gas-producing material; a cementitious material; and an aqueous carrier; and releasing the accelerator from the accelerator composite.

Aspect 2. The method as in any prior Aspect, wherein the cement slurry further comprises an aggregate.

Aspect 3. The method as in any prior Aspect, wherein releasing the accelerator comprises breaking the shell by heating the disintegrating agent to cause the phase change material to expand, or to cause the gas-producing material to produce a gas, or a combination thereof.

Aspect 4. The method as in any prior Aspect, wherein the core comprises the phase change material, and the phase change material has a phase transition temperature of about 125° F. (52° C.) to about 1,000° F. (538° C.); and a volumetric expansion of at least 3% during a phase transition relative to a volume of the phase change material before the phase transition.

Aspect 5. The method as in any prior Aspect, wherein the core comprises the phase change material, and the phase change material comprises at least one of an inorganic salt, an eutectic mixture of inorganic salts, a metal hydroxide, an eutectic mixture of an inorganic salt with an organic material, a hydrate of an inorganic salt, a hydrate of metal hydroxide, or an organic material.

Aspect 6. The method as in any one of Aspects 1 to 3, wherein the core comprises the gas-producing material, and the gas-producing material comprises at least one of an azo compound, an azide compound, or a metal carbonyl.

Aspect 7. The method as in any prior Aspect, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

Aspect 8. The method as in any prior Aspect, wherein the accelerator comprises at least one of an alkali metal salt, or an alkali earth metal salt.

Aspect 9. The method as in any prior Aspect, wherein the accelerator comprises at least one of sodium meta silicate or calcium chloride.

Aspect 10. The method as in any prior Aspect, wherein the accelerator composite further comprises a magnetic material.

Aspect 11. The method as in Aspect 10, wherein the method further comprises applying an electromagnetic radiation to the magnetic material to generate heat.

Aspect 12. The method as in any of prior Aspect, wherein the accelerator composite is present in an amount of about 0.5 wt. % to about 10 wt. %, based on the total weight of the cementitious material.

Aspect 13. A cement slurry comprising: an accelerator composite having a shell encapsulating a core comprising an accelerator and a disintegrating agent, the disintegrating agent comprising at least one of a phase change material or a gas-producing material; a cementitious material; and an aqueous carrier; wherein the accelerator comprises at least one of an alkali metal salt, or an alkali earth metal salt.

Aspect 14. The cement slurry as in any prior Aspect, wherein the core comprises the phase change material, and the phase change material has a phase transition temperature of about 125° F. (52° C.) to about 1,000° F. (538° C.); and a volumetric expansion of at least 3% during a phase transition relative to a volume of the phase change material before the phase transition.

Aspect 15. The cement slurry as in any prior Aspect, wherein the core comprises the gas-producing material, and the gas-producing material comprises at least one of an azo compound, an azide compound, or a metal carbonyl.

Aspect 16. The cement slurry as in any prior Aspect, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, or a metallic material.

Aspect 17. The cement slurry as in any prior Aspect, further comprising an aggregate.

Aspect 18. The cement slurry as in any prior Aspect, further comprising at least one of a retarder, a superplasticizer, a reinforcing agent, a self-healing additive, a fluid loss control agent, a weighting agent, an extender, a foaming agent, a dispersant, a thixotropic agent, a lost circulation material, a clay stabilizer, or a ductility control agent.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). In an embodiment, the term "about" means that the value associated with about can vary by 10%. As used herein, size means largest dimension. Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A method of cementing a wellbore, the method comprising:
   injecting into the wellbore a cement slurry comprising:
   an accelerator composite having a shell encapsulating a core comprising an accelerator and a disintegrating agent, the disintegrating agent comprising a phase change material;
   a cementitious material; and
   an aqueous carrier; and
   releasing the accelerator from the accelerator composite, wherein releasing the accelerator comprises breaking the shell by heating the disintegrating agent to cause the phase change material to expand,
   wherein the core comprises the phase change material, and the phase change material comprises at least one of an inorganic salt, an eutectic mixture of inorganic salts, an eutectic mixture of an inorganic salt with an organic material, or a hydrate of an inorganic salt.

2. The method of claim 1, wherein the cement slurry further comprises an aggregate.

3. The method of claim 1, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

4. The method of claim 1, wherein the accelerator comprises at least one of an alkali metal salt, or an alkali earth metal salt.

5. The method of claim 1, wherein the accelerator comprises at least one of sodium meta silicate or calcium chloride.

6. The method of claim 1, wherein the accelerator composite is present in an amount of about 0.5 wt. % to about 10 wt. %, based on the total weight of the cementitious material.

7. A method of cementing a wellbore, the method comprising:
   injecting into the wellbore a cement slurry comprising:
   an accelerator composite having a shell encapsulating a core, wherein the core comprises an inner core of an accelerator, and an outer core of a disintegrating agent disposed between the inner core and the shell, the disintegrating agent comprising a phase change material;
   a cementitious material; and
   an aqueous carrier; and
   releasing the accelerator from the accelerator composite, wherein the core comprises the phase change material, and the phase change material has a phase transition temperature of about 125° F. (52° C.) to about 1,000° F. (538° C.); and a volumetric expansion of at least 3% during a phase transition relative to a volume of the phase change material before the phase transition,
   wherein the phase change material comprises a hydrate of an inorganic salt configured to expand in volume during a phase transition and to release water that generates additional pressure upon vaporization when heated above its boiling point.

8. The method of claim 7, wherein the accelerator comprises at least one of an alkali metal salt, or an alkali earth metal salt.

9. The method of claim 7, wherein the accelerator comprises at least one of sodium meta silicate or calcium chloride.

10. The method of claim 7, wherein the accelerator composite is present in an amount of about 0.5 wt. % to about 10 wt. %, based on the total weight of the cementitious material.

11. A method of cementing a wellbore, the method comprising:
   injecting into the wellbore a cement slurry comprising:
   an accelerator composite having a shell encapsulating a core, wherein the core comprises an inner core of an accelerator, and an outer core of a disintegrating agent disposed between the inner core and the shell, the disintegrating agent comprising a phase change material;
   a cementitious material; and
   an aqueous carrier; and
   releasing the accelerator from the accelerator composite, wherein the accelerator composite further comprises a magnetic material,
   wherein the phase change material comprises a hydrate of an inorganic salt configured to expand in volume during a phase transition and to release water that generates additional pressure upon vaporization when heated above its boiling point.

12. The method of claim 11, wherein the method further comprises applying an electromagnetic radiation to the magnetic material to generate heat.

13. The method of claim 11, wherein the accelerator comprises at least one of an alkali metal salt, or an alkali earth metal salt.

14. The method of claim 11, wherein the accelerator comprises at least one of sodium meta silicate or calcium chloride.

15. The method of claim 11, wherein the accelerator composite is present in an amount of about 0.5 wt. % to about 10 wt. %, based on the total weight of the cementitious material.

* * * * *